US00RE34530E

United States Patent [19]

Kirkpatrick

[11] E Patent Number: Re. 34,530

[45] Reissued Date of Patent: Feb. 1, 1994

[54] DOUGH BALL CONVEYOR LOADER APPARATUS AND METHOD

[75] Inventor: John W. Kirkpatrick, La Habra, Calif.

[73] Assignee: Lawrence Equipment Inc., S. El Monte, Calif.

[21] Appl. No.: 845,336

[22] Filed: Mar. 2, 1992

Related U.S. Patent Documents

Reissue of:

[64] Patent No.: 4,668,524
Issued: May 26, 1987
Appl. No.: 823,943
Filed: Jan. 29, 1986

[51] Int. Cl.[5] ..... A21C 9/08; A21C 11/00

[52] U.S. Cl. ..... 426/502; 99/353; 425/364 R; 425/383; 425/403.1; 426/517

[58] Field of Search ..... 426/496 R, 502, 512, 426/513, 517; 425/364 R, 383, 403.1, 398, 400, 397, 434, 412; 99/353

[56] References Cited

U.S. PATENT DOCUMENTS

| | | | |
|---|---|---|---|
| 776,775 | 12/1904 | Dietz . | |
| 1,064,194 | 6/1913 | Carroll . | |
| 1,130,568 | 3/1915 | Callow . | |
| 1,166,519 | 1/1916 | Hayssen | 425/327 |
| 1,263,317 | 4/1918 | Garza . | |
| 1,412,226 | 4/1922 | Anderson et al. . | |
| 1,601,781 | 10/1926 | Van Houten . | |
| 1,652,325 | 12/1927 | Pletscher . | |
| 1,832,207 | 11/1931 | Heim . | |
| 2,007,686 | 7/1935 | Marasso . | |
| 2,045,228 | 6/1936 | Harber et al. . | |
| 2,093,466 | 9/1937 | Marasso . | |
| 2,189,243 | 2/1940 | Evans . | |
| 2,293,109 | 8/1942 | Bridge | 425/364 |
| 2,409,725 | 10/1946 | Whitmore et al. . | |
| 2,429,042 | 10/1947 | Bader . | |
| 2,431,073 | 11/1947 | Palmer | 425/364 |
| 2,553,683 | 5/1951 | Smith . | |
| 2,746,403 | 5/1956 | Hansen . | |
| 2,750,899 | 6/1956 | Marasso . | |
| 2,829,606 | 4/1958 | Dielentheis | 425/364 |
| 2,845,879 | 8/1958 | Boston | 425/364 |
| 2,856,869 | 10/1958 | Fram et al. | 425/364 |
| 2,859,712 | 11/1958 | Kissinger | 425/364 |
| 2,907,286 | 10/1959 | Ruiz . | |
| 2,953,107 | 9/1960 | Marasso . | |
| 3,146,730 | 9/1964 | White . | |
| 3,167,032 | 1/1965 | Rhodes | 425/364 |
| 3,177,822 | 4/1965 | Archer et al. | 425/364 |
| 3,186,358 | 6/1965 | Archer . | |
| 3,203,369 | 8/1965 | Archer . | |
| 3,223,053 | 12/1965 | Jimenez . | |
| 3,377,965 | 4/1968 | Atwood | 425/364 |
| 3,379,141 | 4/1968 | Groth . | |
| 3,397,655 | 8/1968 | Valadez . | |
| 3,439,632 | 4/1969 | Pirotsky . | |
| 3,565,015 | 2/1971 | Jorgensen . | |
| 3,735,692 | 5/1973 | Marchignoni . | |
| 3,752,341 | 8/1973 | Noel . | |
| 3,821,452 | 6/1974 | Hayashi . | |
| 3,937,852 | 2/1976 | Wolf . | |
| 3,972,672 | 8/1976 | Castro . | |
| 4,019,621 | 4/1977 | Hanson . | |
| 4,030,594 | 6/1977 | Polin . | |
| 4,109,569 | 8/1978 | Kemper . | |
| 4,109,659 | 8/1978 | Sheridan | 128/349 R |
| 4,116,120 | 9/1978 | Kemper . | |
| 4,241,648 | 12/1980 | Longenecker . | |
| 4,281,025 | 7/1981 | Longenecker . | |
| 4,303,677 | 12/1981 | De Acetis . | |
| 4,395,427 | 7/1983 | Fischer et al. . | |
| 4,504,209 | 3/1985 | Skloss . | |
| 4,508,025 | 4/1985 | Schultz . | |
| 4,511,318 | 4/1985 | Kolodesh . | |

FOREIGN PATENT DOCUMENTS

| | | |
|---|---|---|
| 0063400 | 4/1982 | European Pat. Off. . |
| 1080041 | 4/1960 | Fed. Rep. of Germany . |
| 3319666 | 6/1984 | Fed. Rep. of Germany . |
| 1161058 | 6/1985 | U.S.S.R. . |

*Primary Examiner*—Tim Miles
*Attorney, Agent, or Firm*—Lyon & Lyon

[57] ABSTRACT

A dough ball conveyor loader apparatus includes a flat conveyor belt supported horizontally and a loading unit positioned above the belt. The loading unit positions each of a series of dough balls on the belt. The loading unit also forms a flat on each of the dough balls against the flat belt to prevent movement of the dough balls upon movement of the belt.

22 Claims, 3 Drawing Sheets

DOUGH BALL CONVEYOR LOADER APPARATUS AND METHOD

Matter enclosed in heavy brackets [ ] appears in the original patent but forms no part of this reissue specification; matter printed in italics indicates the additions made by reissue.

BACKGROUND OF THE INVENTION

The field of the present invention is the apparatus and method for processing dough balls and particularly concerns the apparatus and method to load dough balls for automated production of tortillas.

Tortillas can be made by hand but this is very labor intensive especially for large volume commercial production. Where tortillas are commercially produced the ball of dough which ultimately forms the tortillas is individually positioned on a flat conveyor belt. This individual positioning is also labor intensive and because of operator speed necessary for high volume, the manual individual positioning does not always provide uniform spacing between dough balls. In addition, these dough balls may roll on the conveyor belt which may result in forming overlapping non-saleable tortillas.

SUMMARY OF THE INVENTION

The present invention is directed to an apparatus and method for loading and precisely positioning dough balls onto a flat conveyor belt.

A loading unit is positioned above the flat conveyor belt for spaced positioning of a series of dough balls on the flat conveyor belt. The loading unit also forms a flat surface on the bottom of each of the dough balls and causes the dough ball to stick to the conveyor belt to prevent rolling or any other movement of the dough balls on the belt. This provides for a predefined uniform spacing between dough balls as well as maintained this uniform spacing which results in more efficient tortilla production with minimum waste. In addition, the maintained position of the dough balls on the conveyor belt provides a more controlled process and a more uniform tortilla.

DETAILED DESCRIPTION OF THE PREFERRED EMBODIMENT

Figure 1:
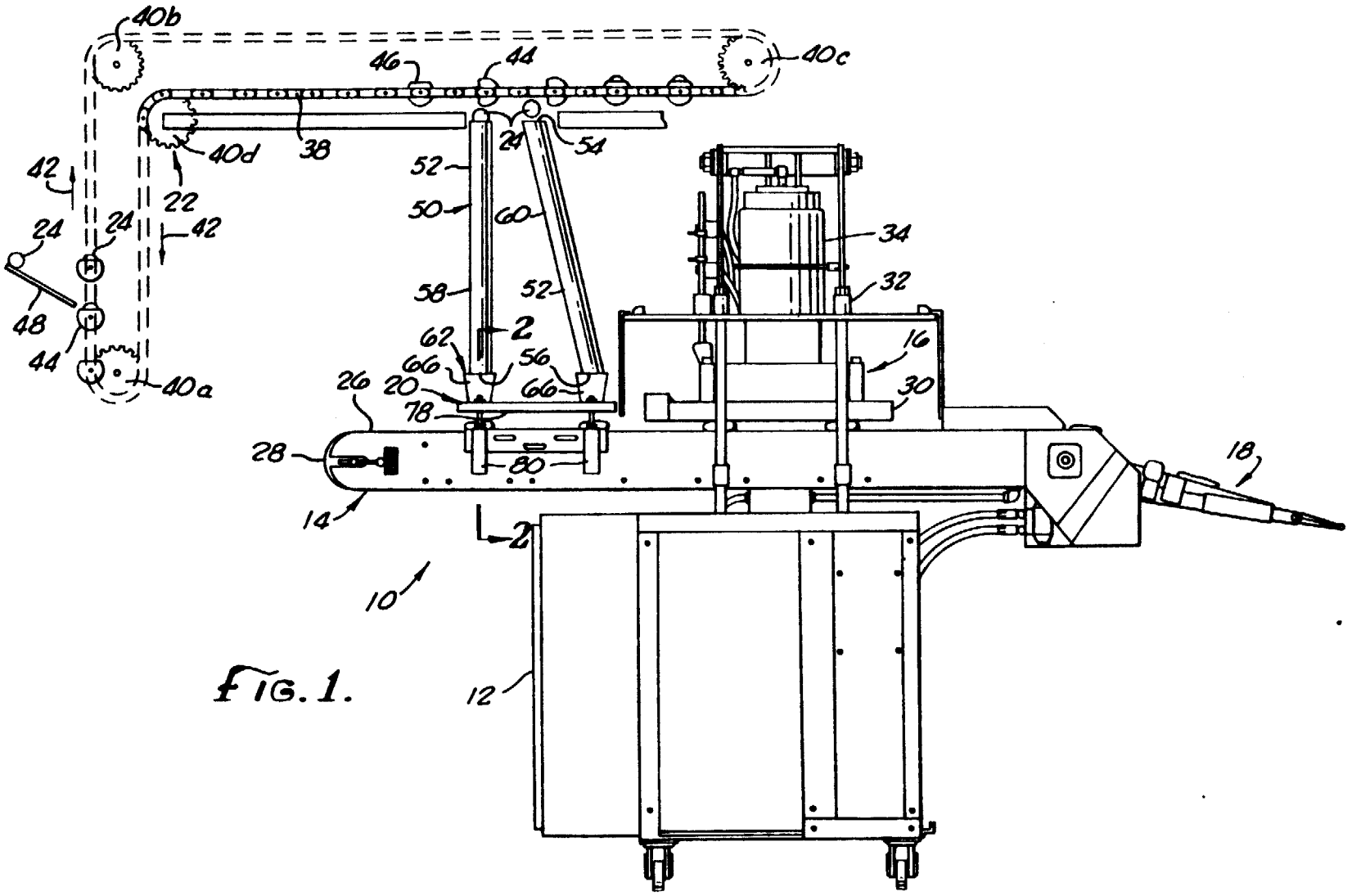
FIG. 1 is a side elevational view of a dough ball processing apparatus illustrating the dough ball loading unit of the invention.

The dough ball processing apparatus 10 illustrated in FIG. 1 includes a frame 12, a conveyor belt unit 14 mounted on the frame 12, a parbaking press unit 16 and a discharge conveyor 18. A loading unit 20 is mounted above the conveyor belt unit 14. A proofer or dough relaxation conveyor 22 is positioned adjacent the loading unit 20 to supply a series of balls of dough or dough balls 24 to the loading unit 20.

The conveyor belt unit 14 is a flat press belt 26 supported horizontally between two end rollers 28 (only the left end roller is shown). The belt 26 preferably is sufficiently wide (as shown in FIGS. 2a through 2g) to accommodate the desired number of rows of torillas being formed, such as one to five rows. As shown in FIGS. 2a through 2g, the belt 26 is wide enough for three rows of tortillas side-by-side. The belt 26 is preferably made of teflon coated fiberglass although *other* materials are satisfactory. The dough balls 24 are of a consistency that they normally stick or adhere to the belt 26 when they are loaded onto the belt 26. Once the tortilla is parbaked by the parbaking press unit 16, the tortilla no longer sticks to the belt 26 and is easily unloaded onto the discharge conveyor 18.

The parbaking press unit 16 is conventional and includes a pressing platten 30 mounted on a support 32 and operated by platten operating cylinder 34. The platten 30 is urged downwardly at a high force to fully flatten the dough balls 24 to form the tortilla into its final shape. The platten 30 is heated to about 350° to 450° F. and serves to parbake the tortillas in about 0.7 to 2.2 seconds depending on the type of dough. Parbaking in the parbaking unit 16 seals the surfaces of the tortilla to keep in moisture. As previously described this parbaking also causes the dough to release from the teflon coated fiberglass belt 26.

The belt 26 is also supported and travels over a belt support member 36 (shown in FIGS. 2a through 2g). The portion of the belt support member 36 under the platten 30 (not shown) is heated so that both sides of the tortilla shape is parbaked.

The relaxation conveyor 22 includes a chain 38 which is of sufficient length to provide the time duration desired for allowing the dough balls to relax, as well known in the baking art. The chain 38 passes over numerous sprockets of which four sprockets 40a through 40d are shown. One or more of the sprockets is driven (not shown) to move the conveyor 22 in the direction of arrows 42. Each dough ball 24 is on the relaxation conveyor 22 for about 10 minutes. This permits the dough of the dough ball 24 to "relax" following the forming of the dough ball 24.

A series of spaced individual dough ball carrying containers or buckets 44 are pivotally supported on the chain 38. Each of the buckets 44 are eccentrically pivoted so that the open portion is at the top 46 to permit carrying of a dough ball 24.

Each dough ball 24 is loaded into each bucket 44 by sliding or rolling it down a loading chute 48 into the bucket. Each dough ball 24 is unloaded by pivoting each bucket 44 to dump the dough ball 24 out to supply the loading unit 20 as will be described.

A transfer tube unit 50 supplies the dough balls 24 from the relaxation conveyor 22 to the loading unit 20. The transfer tube unit 50 includes transfer tubes 52. Each transfer tube 52 has a top entrance opening 54 and a bottom discharge opening 56. As shown in FIGS. 1 and FIGS. 2a through 2g there is a first set 58 of three transfer tubes 52 in a line spaced across the conveyor belt 26 and, as shown in FIG. 1, there is a second set 60 (only the outer tube is shown) of three similar transfer tubes 52. The first and second sets 58 and 60 are spaced as shown in FIG. 1 to permit forming one or more rows of tortillas simultaneously and, as shown in the drawings, two rows of tortillas are spaced from each other along the belt 26 in the direction of the belt movement.

In each of the sets 58 and 60 of transfer tubes 52 a top opening 54 is positioned adjacent a bucket 44. A bucket tipping unit (not shown) tips over each of the buckets 44 when they pass over the top opening 54 of each of the transfer tubes 52 to supply one dough ball 24 through each of the six tubes 52 to the loading unit 20.

The loading unit 20 includes a loading tube unit 62 and a slide plate 64. The loading unit 20 positions each of the series of supplied dough balls 24 in spaced relationship on the belt 26 and provides a flat on the bottom of each of the dough balls 24 to inhibit rolling movement and causes the dough balls to stick to the belt to prevent any other movement of the dough balls 24 relative to the belt 26.

The slide plate 64 is positioned under the loading unit 20 and is moveable between one position closing the loading tube unit 62 to permit the loading tube unit 62 to hold a dough ball 24 and another position opening the loading tube unit 62 for loading each dough ball 24 into a predefined position on the belt 26.

The loading tube unit 62 includes a plurality of tapered loading tubes 66 positioned beneath the lower ends of the transfer tubes 52 and each tube 66 is mounted to a loading tube plate 68. The loading tubes 66 include an inclined side surface 70 for guiding each of the dough balls 24. The smaller or lower end 72 of the tube 66 is at a predefined position above the slide plate 62.

The slide plate 64 contains a plurality of openings 74 therethrough for final guiding and positioning of each dough ball 24 onto the belt 26. Means are provided for moving the slide plate 64 to position each of a series of dough balls 24 on the belt 24 and for providing a flat side against the belt 26 on each of the dough balls 24. The means for moving the loading unit 20 includes a first set of four vertically moveable air cylinders 80 and a single horizontally moveable air cylinder 82.

The slide plate 64 also has a lower or [flatner] *flattener* surface 78. The slide plate 64 is formed of delrin for its non-stick properties and it is also covered at the lower surface 78 with a rough weave cotton-polyester blend of cloth to prevent this surface 78 from sticking to the dough balls 24 as will be described.

The belt 26 moves intermittently and only after the dough balls 24 are positioned and moves or indexes a predefined amount after which it stops for the pressing and parbaking by unit 16 and for the next in the series of dough balls 24 to be positioned.

The method of operation of the apparatus 10 now will be described. The dough balls 24 may be made mechanically or by hand. Each of the dough balls 24 are loaded onto the dough relaxation conveyor 22, one into each of the individual carrying containers or buckets 44. The buckets 44 move each dough ball 24 to a transfer tube 52. The buckets 44 are tipped to supply each dough ball 24 into a transfer tube 52. Each transfer tube 52 guides a dough ball 24 to the loading unit 20. The loading unit 20 loads each dough ball 24 in a predefined spaced position on the belt 26. The loading unit 20 also forms a flat on the bottom of each of the dough balls 24 and causes the dough balls 24 to stick to the belt 26 to prevent each of the dough balls 24 from moving relative to the belt 26 during *the acceleration and deceleration* movement of the belt 26. The belt 26 with each of the positioned dough balls 24 is then moved to a predetermined position of the belt 26 for loading the next in the series of dough balls 24.

Figure 2A:
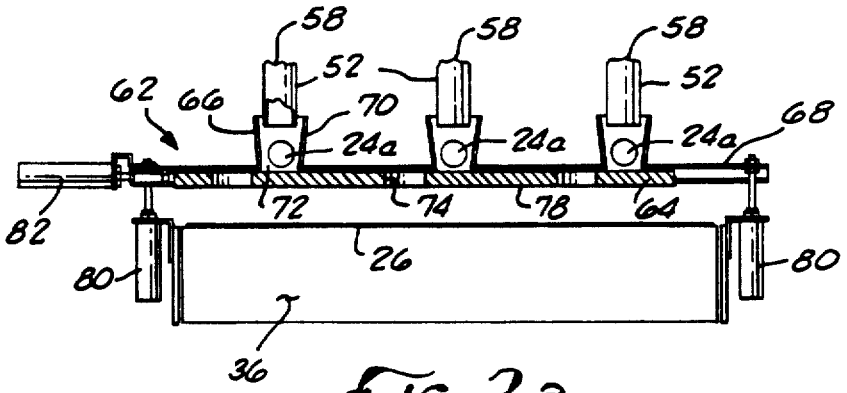
FIGS. 2a through 2g each show a sectional view on section 2—2 of the dough ball loading unit of FIG. 1 illustrating each processing operation for a series of dough balls.

The method of operation of the loading unit 20 is further illustrated by referring to the successive steps shown in FIGS. 2a through 2g. The method of operation of the loading unit 20 is initiated or starts with transferring a dough ball 24a into a loading tube 52, the loading tube 52 is mounted substantally vertically above the belt 26. The loading tube 52 is closed at the lower end 72 by the slide plate 64 having [a] openings 74 therethrough. In FIG. 2a, dough balls 24a transferred through loading tubes 52 rest on the top of the slide plate 64 being guided by the lower ends 72 of the loading tubes 66. In the first position or step shown in FIG. 2a, the loading unit 20 is in the up position with the set of four air cylinders 80 extended upwardly. The horizontal air cylinder 82 is shown retracted to position the slide plate 64 to close the lower end 72 of each loading tube 66.

Figure 2B:
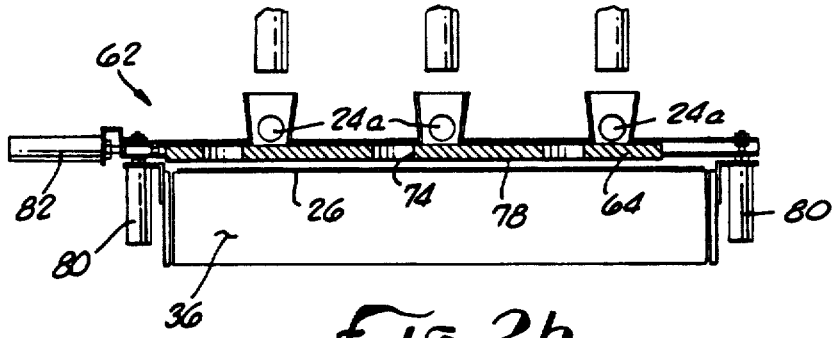

The loading unit 20 is then moved downwardly to a position adjacent the belt 26 as shown in FIG. 2b. In this second operation of the loading unit 20 the first set of four air cylinders [78] *80* are shown retracted to position the loading unit 20 in the down position. In the down position the slide plate 64 is adjacent the belt 26 and the dough balls 24a continue to rest on top of the slide plate 64.

Figure 2C:
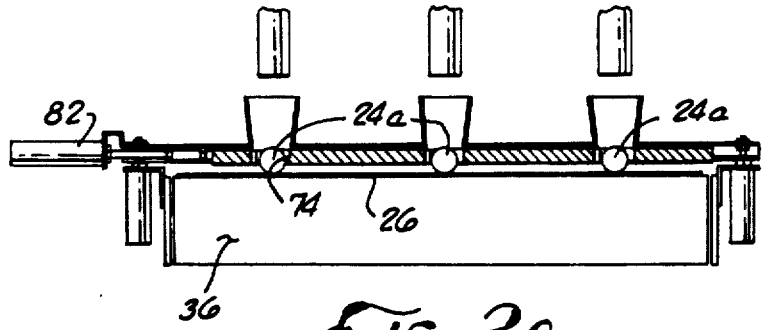

The slide plate 64 is then moved horizontally, as shown in FIG. 2c, to align the openings 74 therein with the lower ends 72 of the loading tubes 66 to drop the dough balls 24a through the openings 74 into the desired positions on the belt 26 while it is stopped. This is accomplished by extending the horizontal air cylinder 82 to shift the slide plate 64 laterally of the belt 26.

Figure 2D:
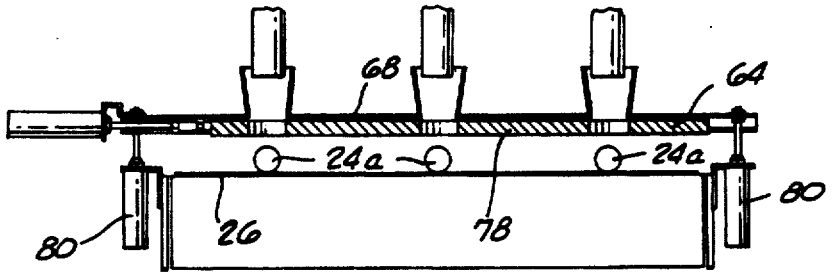

The loading unit 20 with slide plate 64 is then moved upward until the lower surface of the [slides] *slide* plate 64 is above the level of the dough balls 24a now positioned on the belt 26, as shown in FIG. 2d by extending the four air cylinders 80. In this position, the dough balls 24a remain in the same location on the belt 26 in their predefined positions since the belt 26 is not moving.

Figure 2E:
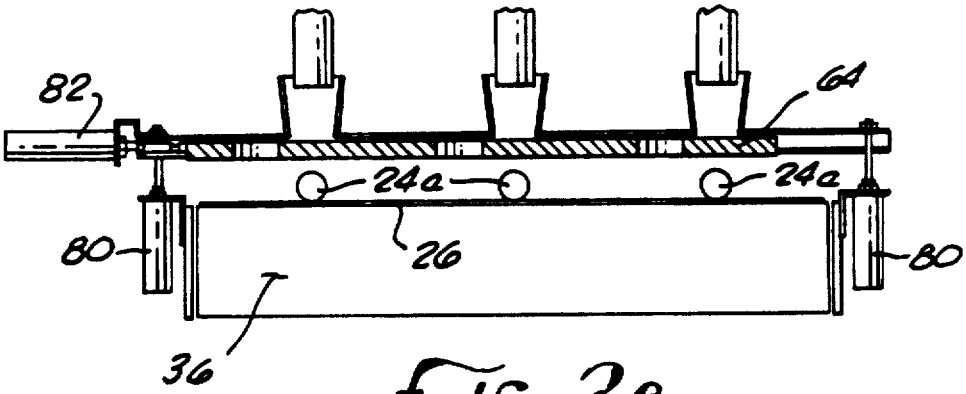

The slide plate 64 is then moved horizontally to close the lower end 72 of each loading tube 66, as shown in FIG. 2e, by retracting the air cylinder 82. The slide plate 64 is now positioned with the solid lower surface or flattening surface 78 above the dough balls 24a. As previously described, this surface is covered with a woven cloth to prevent sticking to the dough balls 24a.

Figure 2F:
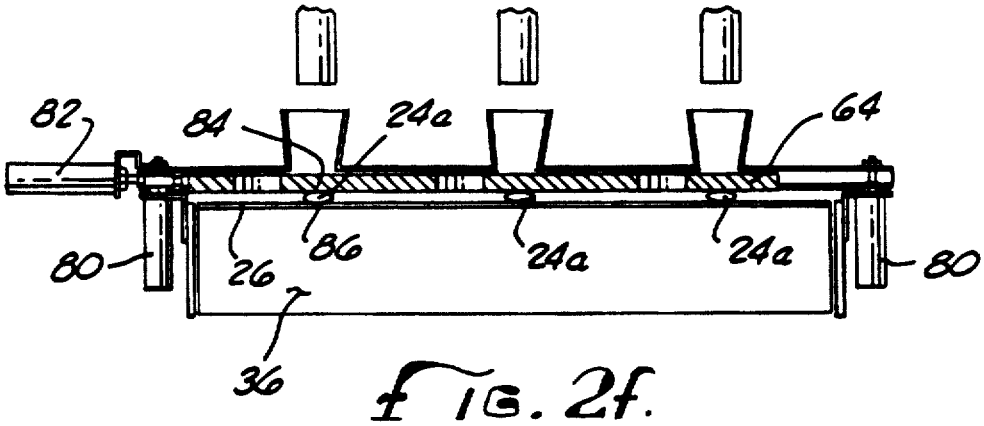

The slide plate 64 is then moved vertically to the down position to force the lower [flatner] *flattener* surface 78 against the dough balls 24a, as shown in FIG. 2f, by the four air cylinder 80 to form an upper flat 84 on the upper side of the dough balls 24a and a lower flat 86 on the lower side of the dough balls 24a, as well as to cause the dough balls 24a to stick to the belt.

Figure 2G:
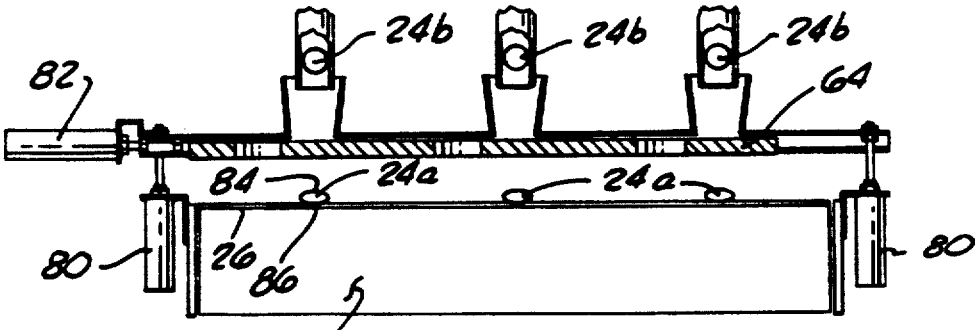

Then the loading unit 20 and slide plate 64 are moved vertically by the air cylinders 80 to the up position with the slide plate 64 above the dough balls 24a and positioned for receiving the next series of dough balls 24b, as shown in FIG. 2g, which is the same as the position illustrated in FIG. 2a. Thus, the loading unit is ready to start the next cycle. The belt moves forward to position the dough balls 24b under the platten 30 for pressing and parbaking the dough balls 24b. Since the dough balls 24b have a flat bottom 86 sticking to the belt 26, the dough balls remain in their predefined positions on the belt 26 during the movement of the belt 26 for properly spaced forming by the platten 30 into tortillas.

Although the novel apparatus is shown with a belt 26 for processing three tortillas wide, the belt may be of a width to process more or few tortillas. A single set or more than two sets of transfer tubes also may be used. It also will be apparent to those skilled in the art that other modifications are possible without departing from the described inventive concepts. Therefore, the invention is not to be restricted except in the spirit of the following claims.

I claim:

[1. The method of processing dough comprising positioning a ball of the dough in a predefined position on a conveyor belt, providing a flat on said ball of dough facing said belt, said flat only sufficient to prevent said dough from moving relative to said conveyor belt during movement of said conveyor belt, and moving said conveyor belt with said dough thereon.]

[2. The method of processing a series of balls of dough comprising making a plurality of balls of dough, moving each of said balls of dough on a dough relaxation conveyor having a series of individual carrying containers, each container moving a single ball of dough to a transfer unit, transferring said balls of dough singly in a predefined spaced position onto a conveyor belt, forming a flat on each of said balls of dough at least on the surface thereof against said conveyor belt to prevent said balls of dough from moving during movement of said conveyor belt, and moving said conveyor belt with said balls of dough thereon to provide said predefined spaced position on said belt.]

3. The method of processing a series of individual balls of dough comprising transferring a ball of dough into a loading tube mounted substantially vertically above a flat conveyor belt, said loading tube being closed at the lower end thereof by a slide plate, said slide plate having a lower [flatner] *flattener* surface and an opening therethrough, vertically moving said loading tube down to adjacent said conveyor belt, then horizontally moving said slide plate to align said opening therein with said loading tube to load said ball of dough through said opening onto said conveyor belt in a predefined position, then vertically moving said slide plate up until said lower surface of said slide plate is above said ball of dough positioned on said conveyor belt, then horizontally moving said slide plate to close said opening at the lower end of said loading tube, then vertically moving said slide plate down until said [flatner] *flattener* surface thereof is forced against said dough ball to form at least a flat thereon against the conveyor belt and cause the dough ball to adhere to the conveyor belt to prevent said dough ball from moving during movement of said conveyor belt, then moving said slide plate vertically until said slide plate is above said dough ball and positioned for transferring the next ball of dough into said loading tube, and then moving said conveyor belt with said ball of dough thereon a predefined amount to permit positioning a subsequent positioned ball of dough thereon spaced from said prior ball of dough.

[4. The method defined in claim 1 of processing a series of individual balls of dough further comprising thinning and parbaking each ball of dough to form a tortilla thereof.]

[5. Apparatus for processing a series of dough balls comprising a flat conveyor belt supported substantially horizontally, a loading unit positioned above said belt for positioning each of the series of dough balls in spaced relation on said belt, said loading unit causing a flat on each of said dough balls against said belt to prevent movement of said dough balls relative to said belt.]

[6. The apparatus defined in claim 5 further including a dough ball relaxation conveyor having a series of individual carrying containers, each carrying container supplying a single dough ball to said loading unit.]

[7. The apparatus defined in claim 5, wherein said loading unit including a loading tube unit having a tube means for each dough ball, and a slide plate positioned under said loading tube unit, said plate moveable between one position closing said loading tube unit for holding each dough ball and another position opening said loading tube unit for loading said dough balls in a predefined position on said belt between said plate and said belt.]

[8. The apparatus defined in claim 7 wherein said plate has a loading opening therethrough for each tube means, said loading opening aligned with said loading tube unit in said other position for said loading of said dough balls.]

[9. The apparatus defined in claim 5 further comprising means for moving said loading unit for causing said positioning each of said series of dough balls on said belt and said flat on each of said dough balls.]

[10. The apparatus defined in claim 6 further comprising a transfer tube unit for transferring each of said dough balls from said relaxation conveyor to said loading unit.]

[11. The apparatus defined in claim 7 wherein said belt is made of teflon coated fiberglass.]

[12. The apparatus defined in claim 5 wherein said loading unit comprises a loading tube unit, and a slide plate positioned under said loading tube unit, said plate moveable horizontally between one position in which said plate closes said loading tube unit and another position in which said plate opens said loading tube unit for positioning said dough balls on said flat belt, said plate moveable vertically in said other closed position down against each said positioned dough ball to provide said flat thereon.]

13. An apparatus for precisely loading a plurality of dough balls on a conveyor belt that is intermittently moved, comprising, loading tube means positioned above the conveyor belt and having a plurality of tubes for receiving each of said plurality of dough balls, a plate positioned beneath said loading tube means for supporting said dough balls in said tubes in a first position of said plate, means for horizontally moving said plate [relation] *relative* to said tube means between said first position and a second position, said plate having a plurality of openings positioned to align with said plurality of tubes in said second position for dropping the plurality of dough balls onto said conveyor belt, and means for moving said [place] *plate* vertically for flattening said dough balls on the conveyor belt.

14. The apparatus of claim 13 wherein said plate is vertically positioned adjacent the conveyor belt in said second position for positively locating the dough balls on the conveyor belt.

15. The apparatus of claim 13 wherein said loading tube means is moved vertically in unison with said plate.

*16. The method of processing dough comprising;*

*substantially simultaneously positioning each of a plurality of balls of the dough in a predefined position on a stopped conveyor belt in a pattern extending both along and across the conveyor belt and physically confining each ball of dough in its said position on the conveyor belt against movement in any horizontal direction,*

*mechanically pressing downwardly with a flattener surface on each ball of dough substantially simultaneously while the conveyor belt remains stopped for providing a flat on each said ball of dough facing said belt and forming each ball of dough into a flattened substantially circular shape of substantially uniform thickness,*

*said flat being at least sufficient to prevent each said flattened ball of dough from moving relative to said conveyor belt during movement of said conveyor belt, and*

*accelerating and moving said conveyor belt with said flattened balls of dough thereon and decelerating said conveyor belt to another stopped condition.*

*17. The method of processing dough into tortillas comprising;*

*forming a plurality of balls of the dough,*

*substantially simultaneously positioning each ball of the plurality of balls of dough in a predefined position on a stopped conveyor belt in a pattern extending both along and across the conveyor belt and physically confining each ball of dough in its said position on the conveyor belt against movement in any horizontal direction,*

*mechanically pressing downwardly with a flattener surface on each ball of dough substantially simultaneously while the conveyor belt remains stopped for providing a flat on each said ball of dough facing said belt and forming each ball of dough into a flattened substantially circular shape of substantially uniform thickness,*

*said flat being at least sufficient to prevent each said flattened ball of dough from moving relative to said conveyor belt during movement of said conveyor belt,*

*accelerating and moving said conveyor belt with said flattened balls of dough thereon and decelerating said conveyor belt to another stopped condition, and*

*pressing and parbaking the flattened balls of dough to a thin substantially circular shape of a tortilla while the conveyor belt is in said another stopped condition.*

*18. The method of processing a series of balls of dough comprising;*

*making a plurality of balls of dough,*

*moving each of said balls of dough on a dough relaxation conveyor having a series of individual carrying containers, each container moving a single ball of dough to a transfer unit,*

*transferring said balls of dough singly from the individual carrying containers into separate downwardly extending tubes of the transfer unit and the transfer unit substantially simultaneously depositing each of the plurality of balls of dough in a predefined spaced position onto a stopped conveyor belt in a pattern extending both along and across the conveyor belt and confining the balls of dough in that pattern on the conveyor belt against movement in any horizontal direction,*

*moving mechanical flattener means downwardly while the conveyor belt remains motionless for substantially simultaneously engaging and forming each ball of dough into a flattened substantially circular shape with a flat on each of said balls of dough at least on the surface thereof against said conveyor belt to prevent said balls of dough from moving during subsequent movement of said conveyor belt,*

*moving the mechanical flattener means upwardly to a position spaced above each of said flattened balls of dough, and*

*moving said conveyor belt with said flattened balls of dough thereon to provide said predefined spaced position on said belt.*

*19. The method of processing a series of balls of dough into tortillas comprising;*

*making a plurality of balls of dough,*

*moving each of said balls of dough on a dough relaxation conveyor having a series of individual carrying containers, each container moving a single ball of dough to a transfer unit,*

*transferring said balls of dough singly from the individual carrying containers into separate downwardly extending tubes of the transfer unit and the transfer unit substantially simultaneously depositing each of the plurality of balls of dough in a predefined spaced position onto a stopped conveyor belt in a pattern extending both along and across the conveyor belt and confining the balls of dough in that pattern on the conveyor belt against movement in any horizontal direction,*

*moving mechanical flattener means downwardly while the conveyor belt remains motionless for substantially simultaneously engaging and forming each ball of dough into a flattened substantially circular shape with a flat on each of said balls of dough at least on the surface thereof against said conveyor belt to prevent said balls of dough from moving during subsequent movement of said conveyor belt,*

*moving the mechanical flattener means upwardly to a position spaced above each of said flattened balls of dough, and*

*moving said conveyor belt with said flattened balls of dough thereon to a second position beneath a press and substantially simultaneously pressing and parbaking each of said balls of dough to a thin and substantially circular shape of a tortilla in said predefined spaced position on said belt while said belt is stopped in said second position.*

*20. Apparatus for processing a series of dough balls comprising;*

*a flat conveyor belt supported substantially horizontally,*

*means for intermittently moving the belt with acceleration and deceleration between stopped conditions, and*

*a loading unit positioned above said belt for positioning each of the series of dough balls in spaced relation on said belt during a stopped condition of the belt, said loading unit including a plurality of downwardly extending tubes equal in number to the number of dough balls in the series being processed for each said tube to guide a single dough ball toward the belt, said loading unit including means for substantially simul-*

*taneously depositing each of the dough balls on the belt and confining each dough ball on the conveyor belt from movement in any horizontal direction with the series of dough balls forming a pattern extending both along and across the belt, said loading unit having mechanical flattener means movable downwardly while the belt remains in that stopped condition and said dough balls remain in said pattern for substantially simultaneously engaging and flattening each said dough ball into a substantially circular shape and causing a flat on each of said dough balls against said belt to prevent movement of said dough balls relative to said belt during said intermittent movement of the belt between the stopped conditions.*

*21. The apparatus defined in claim 20 further comprising means for moving said loading unit for causing said positioning of each of said series of dough balls on said belt and said flat on each of said dough balls.*

*22. The apparatus defined in claim 20 wherein said loading unit includes a slide plate positioned under said tubes, said plate moveable horizontally between one position in which said plate closes said tubes and another position in which said plate opens said tubes for positioning said dough balls on said flat conveyor belt, said plate comprising said mechanical flattener means and being moveable vertically in said other closed position down against each said positioned dough ball to provide said flat thereon.*

*23. Apparatus for processing a series of dough balls comprising:*

*a flat conveyor belt supported substantially horizontally,*

*means for intermittently moving the belt with acceleration and deceleration between stopped conditions, and*

*a loading unit positioned above said belt for positioning each of the series of dough balls in spaced relation on said belt during a stopped condition of the belt, said loading unit including a plurality of downwardly extending tubes equal in number to the number of dough balls in the series being processed for each said tube to guide a single dough ball toward the belt, said loading unit including means for substantially simultaneously depositing each of the dough balls on the belt and confining each dough ball on the conveyor belt from movement in any horizontal direction with the series of dough balls forming a pattern extending both along and across the belt, said loading unit having mechanical flattener means movable downwardly while the belt remains in that stopped condition and said dough balls remain in said pattern for substantially simultaneously engaging and flattening each said dough ball into a substantially circular shape of substantially uniform thickness and causing a flat on each of said dough balls against said belt to prevent movement of said dough balls relative to said belt during said intermittent movement of the belt between the stopped conditions, and*

*a slide plate in said loading unit positioned under all of said tubes, said plate moveable between one position closing said tubes for holding each dough ball and another position opening said tubes for loading said dough balls in said pattern on said belt.*

*24. The apparatus defined in claim 23 wherein said plate has a loading opening therethrough for each said tube, a said loading opening aligned with each said tube in said other position for said loading of said dough balls onto the belt.*

*25. The apparatus defined in claim 24, wherein said plate is positioned adjacent the belt during loading of the dough balls on the belt for each said loading opening to cause said confining of each dough ball from movement in any direction.*

*26. The apparatus defined in claim 23, 24 or 25, wherein said mechanical flattener means is comprised of a flat downwardly-facing surface on said slide plate parallel to said belt for flattening all of said dough balls to substantially the same said uniform thickness.*

*27. The apparatus defined in claim 20 or 23 further including a dough ball relaxation conveyor having a series of individual carrying containers, each carrying container supplying a single dough ball to a said tube of said loading unit.*

*28. The apparatus defined in claim 20 or 23 wherein said belt is made of teflon coated fiberglass.*

*29. Apparatus for processing a series of dough balls comprising*

*a flat conveyor belt supported substantially horizontally,*

*a loading unit positioned above said belt for positioning each of the series of dough balls in spaced relation on said belt, said loading unit comprising means causing a flat on each of said dough balls against said belt to prevent movement of said dough balls relative to said belt,*

*said loading unit including a loading tube unit having a tube means for each dough ball, and*

*a slide plate positioned under said loading tube unit, said plate moveable between one position closing said loading tube unit for holding each dough ball and another position opening said loading tube unit for loading said dough balls in a predetermined position on said belt between said plate and said belt.*

*30. The apparatus defined in claim 29, wherein said plate has a loading opening therethrough for each tube means, said loading opening aligned with said loading tube unit in said another position for said loading of said dough balls.*

*31. The apparatus defined in claim 29 further comprising*

*means for moving said loading unit for causing said positioning of each of said series of dough balls on said belt and said flat on each of said dough balls.*

*32. The apparatus defined in claim 29, wherein said belt is made of teflon coated fiberglass.*

*33. Apparatus for processing a series of dough balls comprising*

*a flat conveyor belt supported substantially horizontally,*

*a loading unit positioned above said belt for positioning each of the series of dough balls in spaced relation on said belt, said loading unit comprising means causing a flat on each of said dough balls against said belt to prevent movement of said dough balls relative to said belt,*

*wherein said loading unit comprises a loading tube unit, and*

*a slide plate positioned under said loading tube unit, said plate moveable horizontally between one position in which said plate closes said loading tube unit and another position in which said plate opens said loading tube unit for positioning said dough balls on said flat belt, said plate moveable vertically in said another closed position down against each said positioned dough ball to provide said flat thereon.*

* * * * *